United States Patent
Fu

(10) Patent No.: US 8,243,428 B2
(45) Date of Patent: Aug. 14, 2012

(54) DISPLAY ASSEMBLY

(75) Inventor: Chien-Chun Fu, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 630 days.

(21) Appl. No.: 12/497,756

(22) Filed: Jul. 6, 2009

(65) Prior Publication Data

US 2010/0289972 A1    Nov. 18, 2010

(30) Foreign Application Priority Data

May 15, 2009   (CN) .......................... 2009 1 0302352

(51) Int. Cl.
*H05K 5/00* (2006.01)
*H05K 7/00* (2006.01)
(52) U.S. Cl. ........... 361/679.21; 361/679.26; 361/679.3; 361/679.55; 361/679.56; 361/679.59; 348/836; 348/838; 348/843; 248/917; 248/918; 248/919

(58) Field of Classification Search ............. 361/679.21, 361/679.26, 679.3, 679.56, 679.55, 679.59; 348/836, 838, 843; 248/917, 918, 919

See application file for complete search history.

(56) References Cited

U.S. PATENT DOCUMENTS

| | | | |
|---|---|---|---|
| 2004/0041851 A1* | 3/2004 | Lu ................................. | 345/905 |
| 2005/0001114 A1* | 1/2005 | Ogawa .......................... | 248/127 |
| 2005/0269479 A1* | 12/2005 | Yeh et al. ...................... | 248/457 |
| 2006/0049327 A1* | 3/2006 | Chen ............................. | 248/371 |
| 2007/0062089 A1* | 3/2007 | Homer et al. .................. | 40/754 |

\* cited by examiner

*Primary Examiner* — Anthony Haughton
(74) *Attorney, Agent, or Firm* — Altis Law Group, Inc.

(57) ABSTRACT

A display assembly includes a flat panel display and a stand. The flat panel display includes a display screen, a housing and an angular adjusting mechanism. The angular adjusting mechanism includes a rotation motor and a transmission unit coupled to the rotation motor. The stand is pivotably attached to the flat panel display. The stand includes a wheel. The wheel is disposed in the housing of the display. The wheel is configured to engage with the transmission unit. The rotation motor is capable of being controlled to actuate the transmission unit and the wheel, thereby driving the stand to laterally rotate relative to the flat panel display.

19 Claims, 10 Drawing Sheets

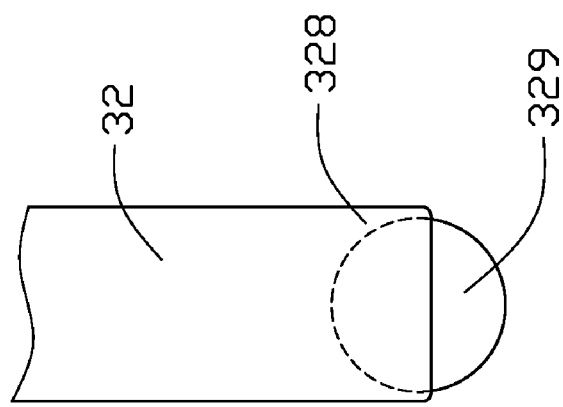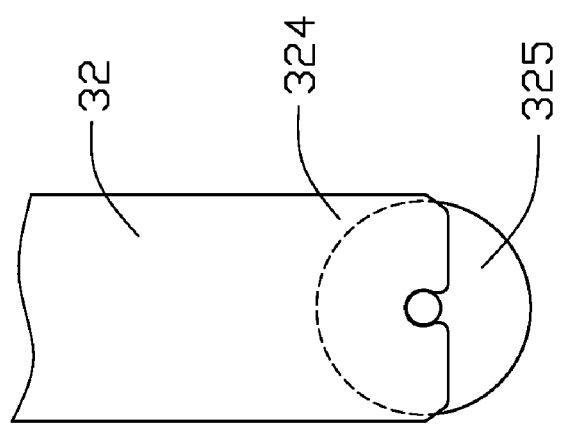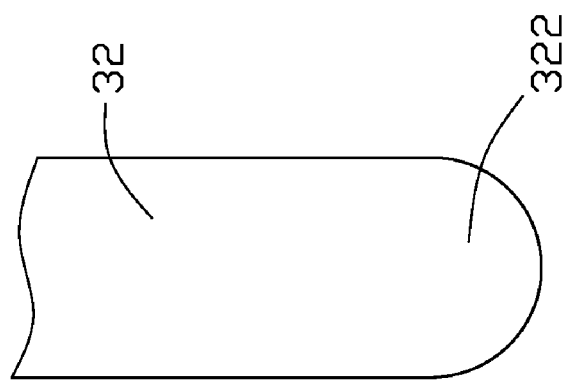
FIG. 8

DISPLAY ASSEMBLY

CROSS-REFERENCE TO RELATED APPLICATION

This application is related to co-pending U.S. patent application entitled "DISPLAY ASSEMBLY", application Ser. No. 12/497,750.

BACKGROUND

1. Technical Field

The disclosure generally relates to display assemblies, especially to a display assembly with an adjustable stand.

2. Description of Related Art

With increases in both the number of people using video display terminals and the amount of time that an individual user spends in front of the terminal, it has become evident that the occurrence of headaches, user fatigue, and eye, neck and back strain has increased. The ergonomics associated with video displays has become a major consideration in display design. A conventional flat display terminal can be manually adjusted through rotating a display screen relative to a stand. However, manual positioning the flat display terminal may require many adjustments, which is inconvenient.

BRIEF DESCRIPTION OF THE DRAWINGS

FIG. 8 is a back view of the supporting potions of FIG. 7.

DETAILED DESCRIPTION

Figure 1:
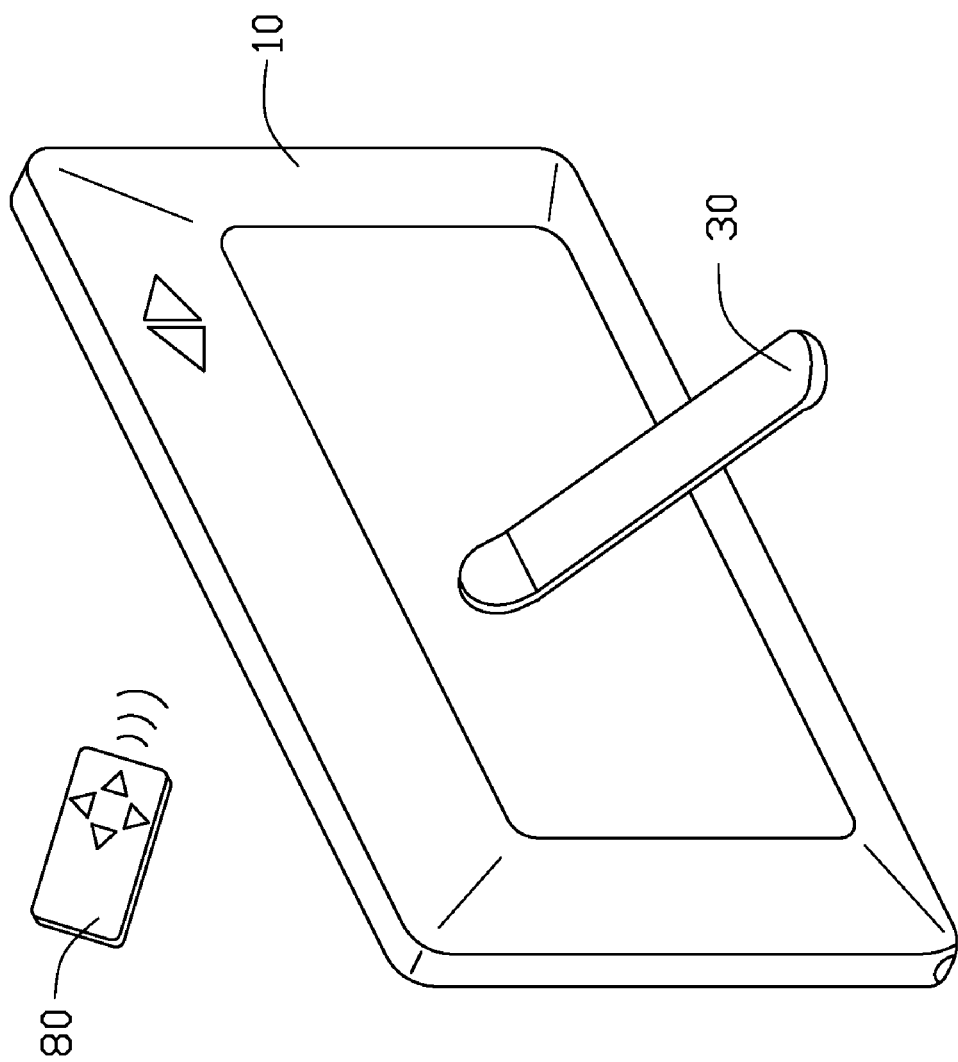
FIG. 1 and FIG. 2 are isometric views of a display assembly.
Figure 2:
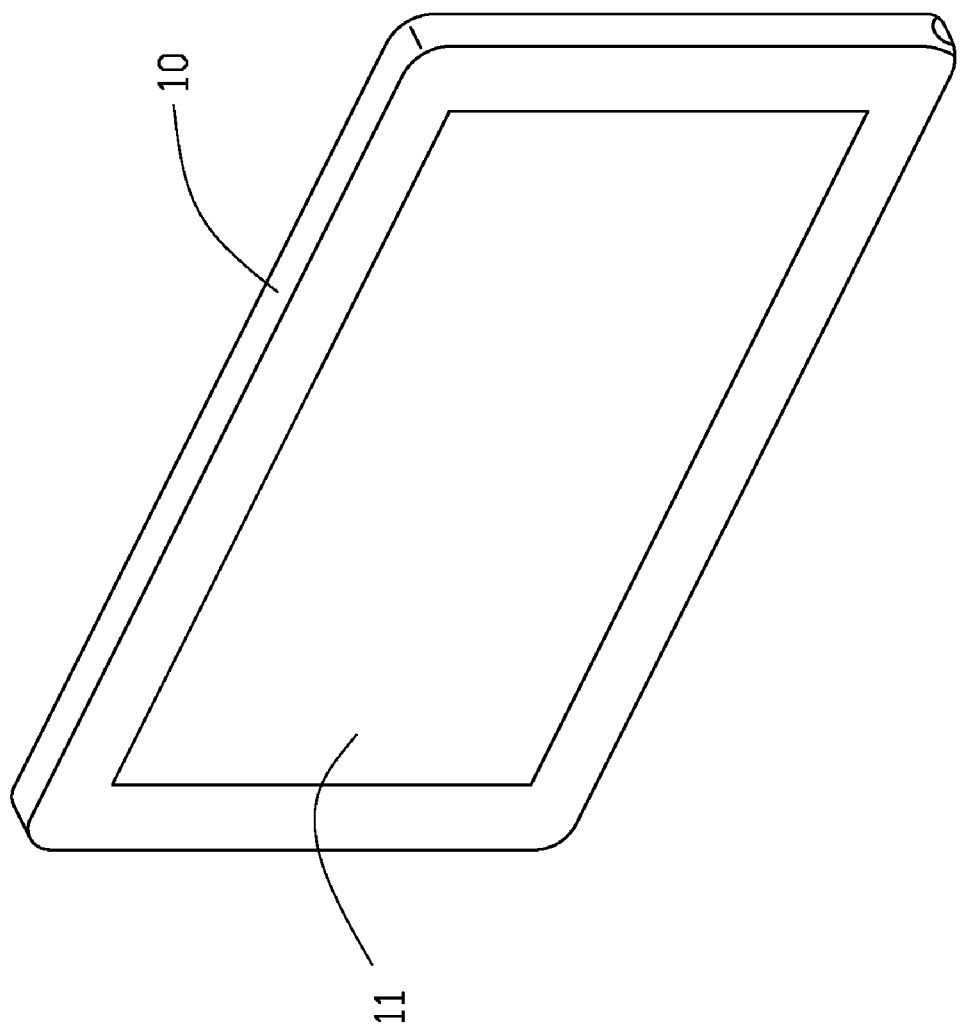
Figure 4:
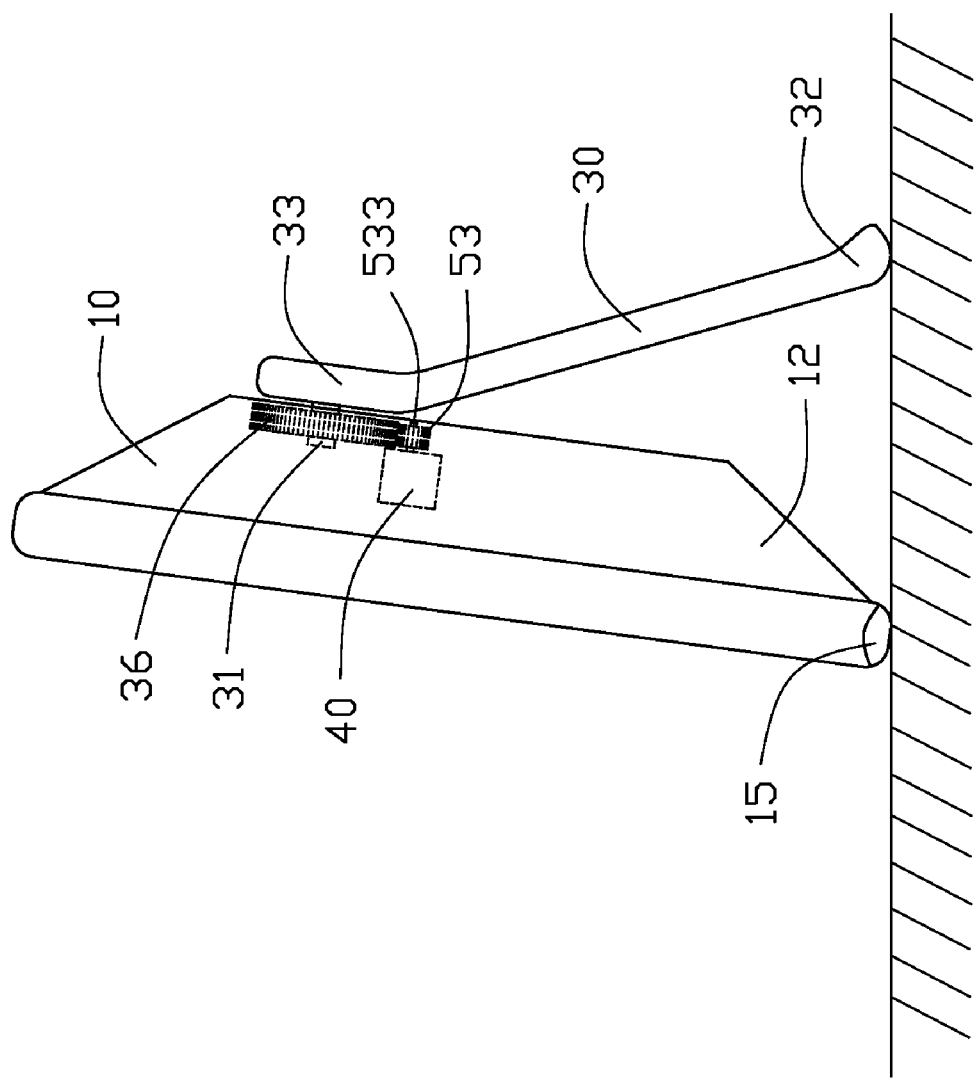
FIG. 4 is a side schematic view of a display and a transmission unit of the display of a first embodiment.

Referring to FIG. 1 and FIG. 2, a display assembly includes a display 10 and a stand 30. The display 10 is a flat panel display 10. The display 10 includes a display screen 11, a housing 12, and an angular adjusting mechanism (as shown in FIG. 4). A tilt angle of the display 10 can be adjusted by an infra-red (IR) remote control 80.

Figure 3:
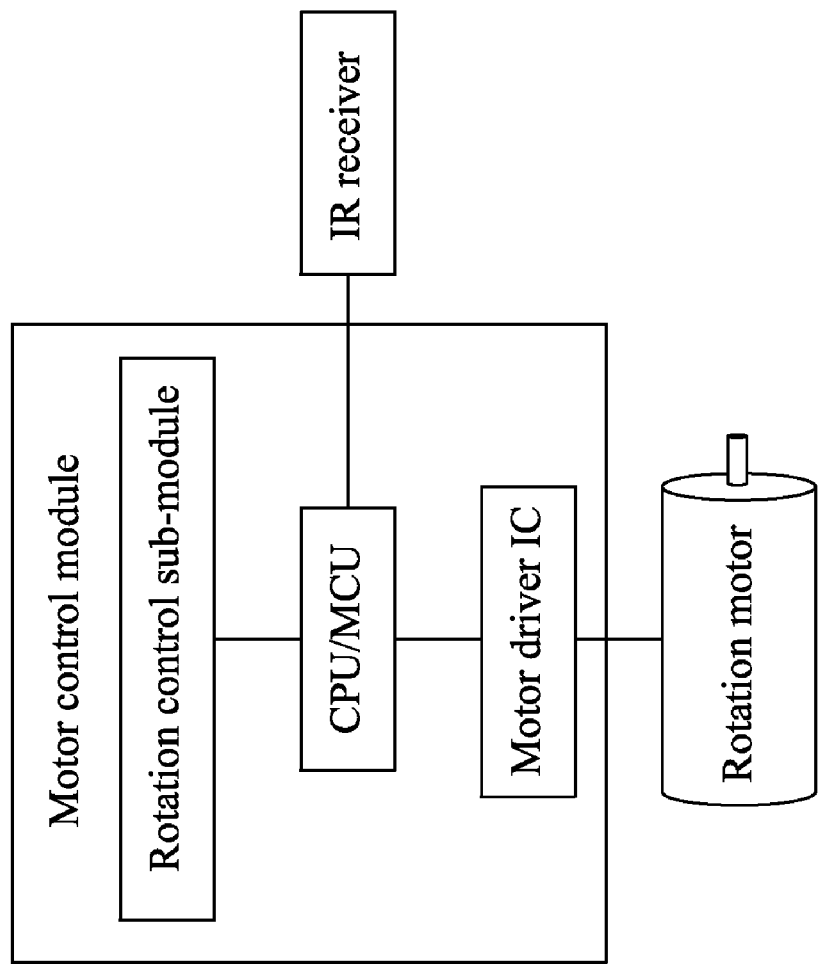
FIG. 3 is a block view of a display.

Referring to FIG. 3 and FIG. 4, the angular adjusting mechanism includes a rotation motor 40, a motor control module being operable for controlling the rotation motor 40, and a transmission unit coupled to the rotation motor 40. The motor control module includes a rotation control sub-module, a central processing unit (CPU) or a microcontroller (MCU), and a motor driver integrated circuit (IC). An IR receiver may be provided to couple to the IR remote control 80. The IR receiver is capable of receiving an adjusting control signal from the remote control 80 and outputting the adjusting control signal to the CPU/MCU. The CPU/MCU is capable of transforming the adjusting control signal into a control command and sending it to the motor driver IC. The rotation control sub-module is capable of acquiring a working state of the rotation motor 40 and sending it to CPU/MCU. The motor driver IC is capable of receiving a control command and controlling the rotation motor 40 to work. The rotation motor 40 can be a reverse rotation motor.

Figure 5:
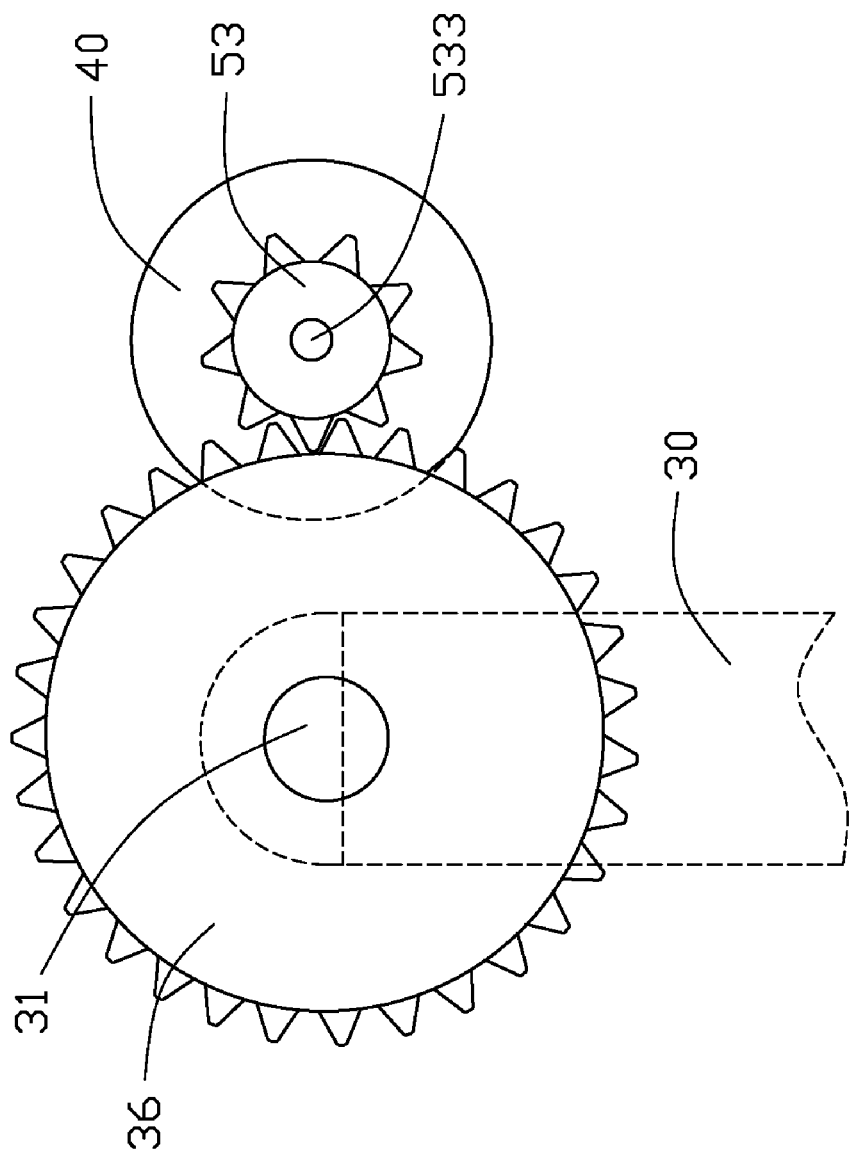
FIG. 5 is a schematic view of the transmission unit of FIG. 4.

Referring to FIG. 4 and FIG. 5, the display 10, supported by the stand 30 in an upright position, is placed on a supporting surface. The stand 30 is also placed on the supporting surface. The stand 30 supports a backside of the display 10. A bottom portion of the display 10 has an anti-skid portion 15. The stand 30 includes a supporting portion 32 and an engaging portion 33 attached to the display 10. The engaging portion 33 is pivotable about a first pivot axis 31. The first pivot axis 31 is perpendicular to the display screen 11. The engaging portion 33 includes a wheel such as a following gear 36 in a first embodiment.

The transmission unit includes a drive gear 53. The drive gear 53 is directly actuated by the rotation motor 40 and meshes with the following gear 36. A diameter of the drive gear 53 is smaller than that of the following gear 36. When the rotation motor 40 receives the control command from the motor driver IC, the rotation motor 40 rotates with the drive gear 53 and the following gear 36, thereby the drive gear 53 drives the stand 30 to rotate along a lateral direction relative to the display 10. A vertical supporting height of the display 10 is lowered. Therefore, a viewing angle of the display screen 11 is adjusted.

Figure 6:
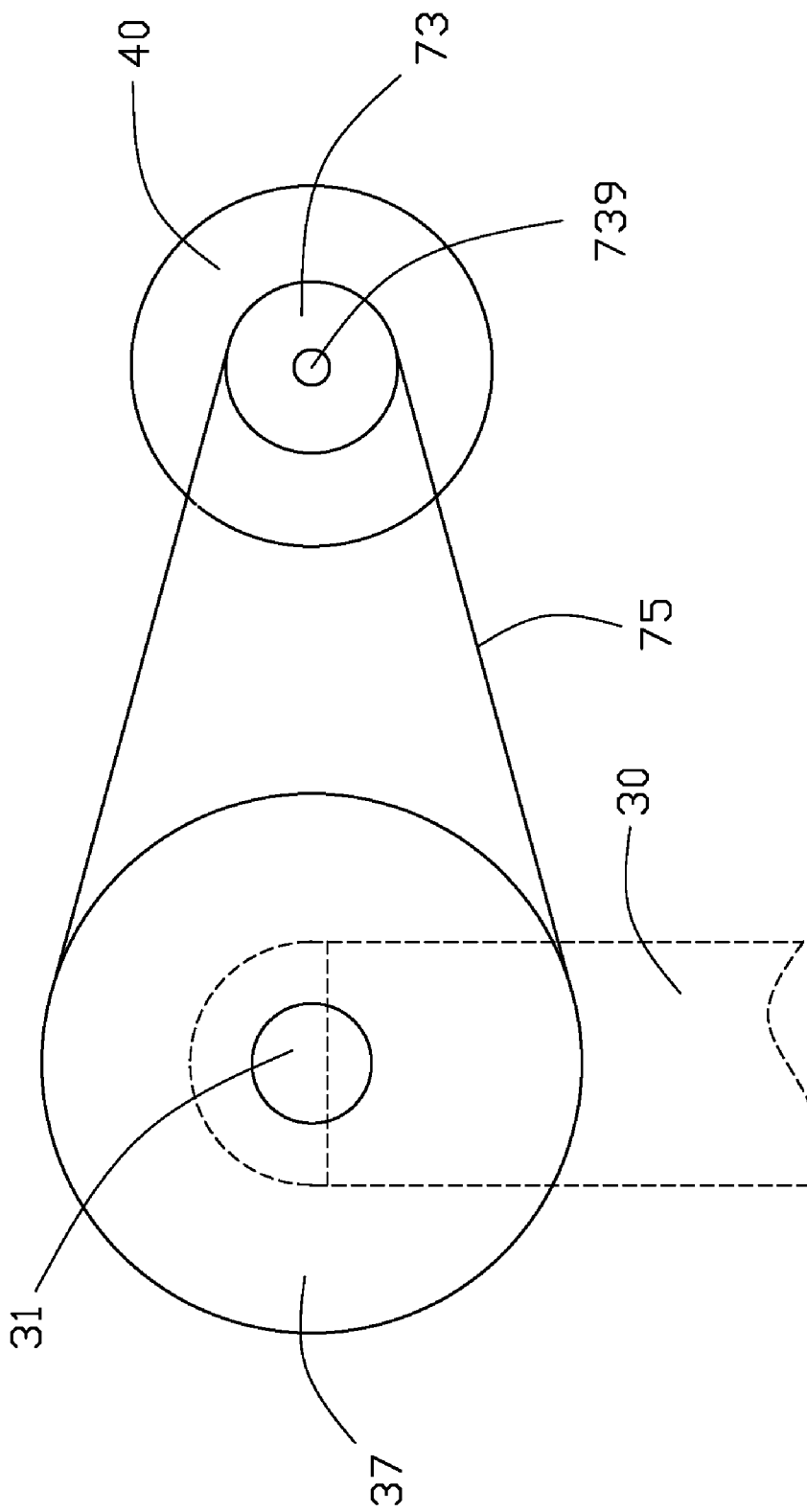
FIG. 6 is a schematic view of a transmission unit of a second embodiment.

Referring to FIG. 6, in a second embodiment, the wheel is a rotation wheel 37. The transmission unit includes a drive wheel 73. The rotation wheel 37 is capable of being driven by the drive wheel 73 by a transmission belt 75. The drive wheel 73 is directly actuated by the rotation motor 40.

Figure 7:
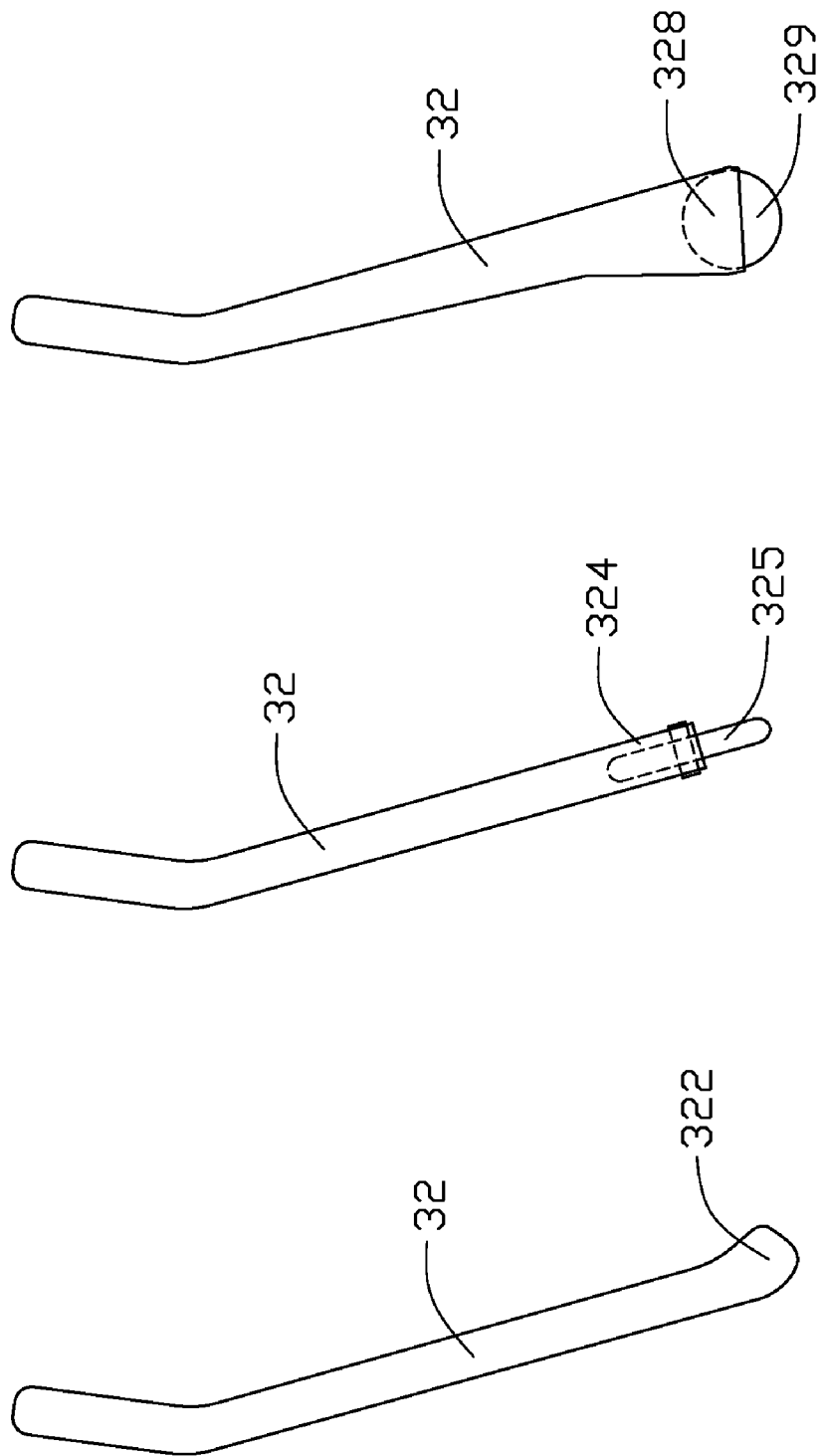
FIG. 7 is a side view of three selectable supporting portions of a stand.

Referring to FIG. 7 and FIG. 8, in above embodiments, the supporting portion 32 may have an arcuate distal end 322 to be supported by the supporting surface. Alternatively, the supporting portion 32 may have a sliding wheel 325 rotatably attached to a distal end 324 or have a ball 329 rotatably inserted into a distal end 328. The stand 30 may be assembled on a left side, a middle side or a right side of the display 10.

Figure 9:
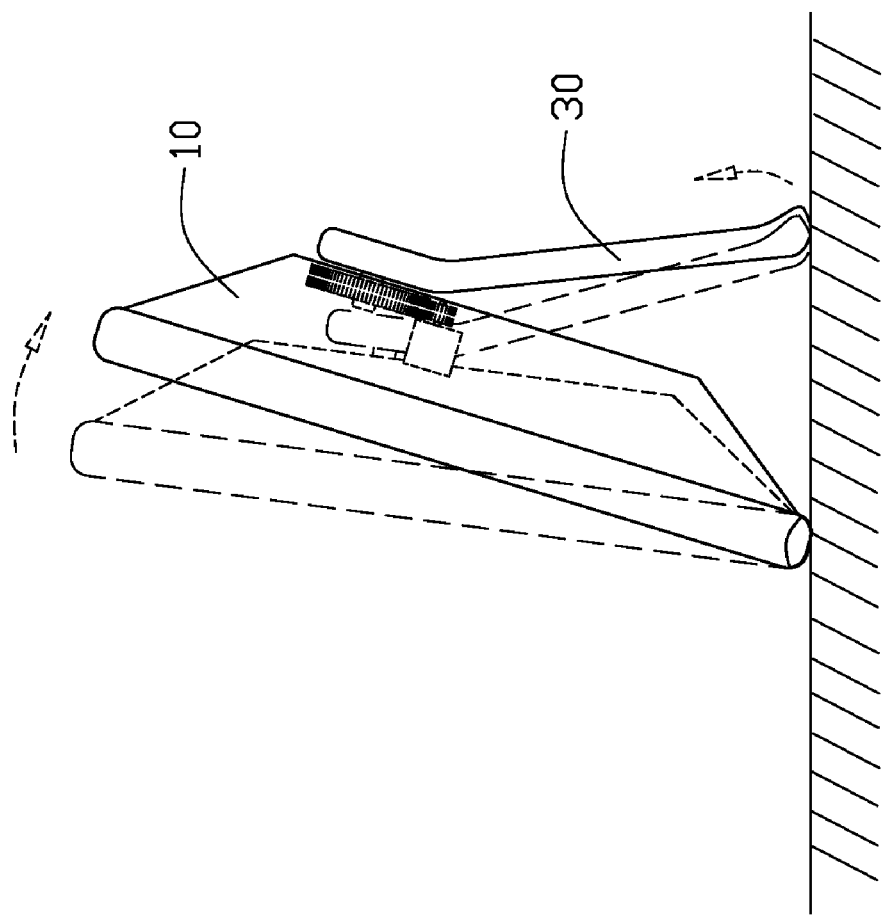
FIG. 9 and FIG. 10 are side views of the display assembly in different angular states.
Figure 10:
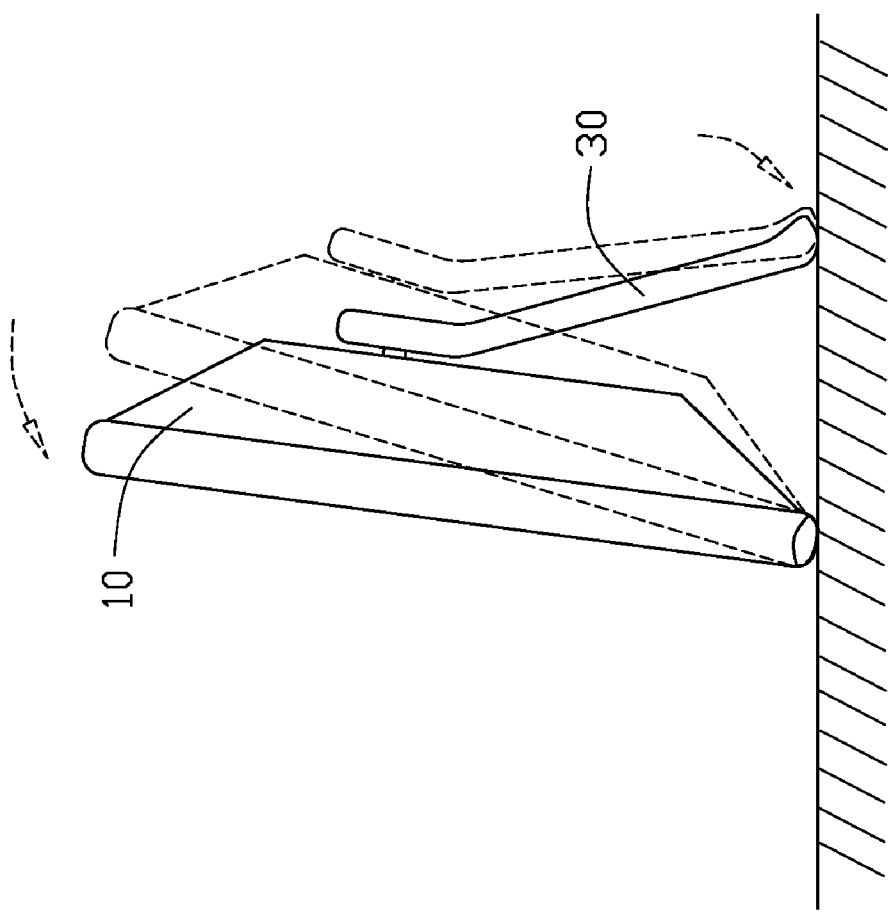

Referring to FIG. 9 and FIG. 10, when adjusting the display assembly, the stand 30 is rotated relative to the display 10 through the angular adjusting mechanism in above embodiments. The supporting portion 32 may rotate laterally relative to the display 10, thereby adjusting tilt angle of the display screen 11. Therefore, a viewer may adjust a viewing angle of the display along a vertical direction precisely and conveniently.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display assembly comprising:
a flat panel display comprising a display screen, a housing and an angular adjusting mechanism; the angular adjusting mechanism comprising a rotation motor and a transmission unit coupled to the rotation motor; and
a stand pivotably attached to the flat panel display, the stand comprising a wheel, the wheel disposed in the housing of the display, the wheel configured to engage with the transmission unit, wherein the rotation motor is capable of being controlled to actuate the transmission unit and the wheel, thereby driving the stand to laterally rotate relative to the flat panel display.

2. The display assembly of the claim 1, wherein the angular adjusting mechanism further comprises a motor control module being operable for controlling the rotation motor, the motor control module comprising a rotation control sub-module, a central process unit (CPU), and a motor driver integrated circuit.

3. The display assembly of the claim 2, wherein the angular adjusting mechanism further comprises an infra-red (IR) receiver connected to the CPU, and the IR receiver is capable of receiving an adjusting control signal from a remote control.

4. The display assembly of the claim 1, wherein the stand and the flat panel display are placed on a supporting surface to corporately afford a weight of the flat panel display.

5. The display assembly of the claim 1, wherein the transmission unit comprising a drive gear, the wheel is a following gear, and the drive gear is directly actuated by the rotation motor and meshes with the wheel.

6. The display assembly of the claim 5, wherein a diameter of the drive gear is smaller than that of the following gear.

7. The display assembly of the claim 1, wherein the transmission unit comprises a drive wheel, the wheel is capable of being driven by the drive wheel by a transmission belt, and the drive wheel is directly actuated by the rotation motor.

8. The display assembly of the claim 1, wherein the rotation motor is a reverse rotation motor.

9. The display assembly of the claim 1, wherein the stand has a sliding wheel at a distal end thereof.

10. The display assembly of the claim 1, wherein the wheel is pivoted to the flat panel display about a first pivot axis, and the first pivot axis perpendicular to the display screen.

11. A display assembly comprising:
a flat panel display comprising a display screen and an angular adjusting mechanism; the angular adjusting mechanism comprising a rotation motor and a transmission unit coupled to the rotation motor; and
a stand pivotably attached to the flat panel display about a first pivot axis, the stand comprising an engaging portion, the engaging portion configured to couple to the transmission unit, the first pivot axis is perpendicular to the display screen, and the rotation motor is capable of being controlled to actuate the transmission unit and the engaging portion, thereby driving the stand to laterally rotate relative to the flat panel display.

12. The display assembly of the claim 11, wherein the angular adjusting mechanism further comprises a motor control module being operable for controlling the rotation motor, the motor control module comprising a rotation control sub-module, a central process unit (CPU), and a motor driver integrated circuit.

13. The display assembly of the claim 12, wherein the angular adjusting mechanism further comprises an infra-red (IR) receiver connected to the CPU, and the IR receiver is capable of receiving an adjusting control single from a remote control.

14. The display assembly of the claim 11, wherein the engaging portion comprises a wheel.

15. The display assembly of the claim 14, wherein the transmission unit comprises a drive wheel, the wheel is capable of being driven by the drive wheel by a transmission belt, and the drive wheel is directly actuated by the rotation motor.

16. The display assembly of the claim 11, wherein the transmission unit comprising a drive gear, the engaging portion comprising a following gear, and the drive gear is directly actuated by the rotation motor and meshes with the following gear.

17. The display assembly of the claim 16, wherein a diameter of the drive gear is smaller than that of the following gear.

18. The display assembly of the claim 11, wherein the rotation motor is a reverse rotation motor.

19. The display assembly of the claim 11, wherein the stand has a sliding wheel at a distal end thereof.

* * * * *